(12) United States Patent
Levandoski et al.

(10) Patent No.: US 7,569,291 B2
(45) Date of Patent: Aug. 4, 2009

(54) METHOD AND COMPOSITION FOR BONDING AND SEALING FUEL CELL COMPONENTS

(75) Inventors: Michael Paul Levandoski, Bristol, CT (US); Robert Michael Sarazin, East Grandy, CT (US)

(73) Assignee: Henkel Corporation, Rocky Hill, CT (US)

( * ) Notice: Subject to any disclaimer, the term of this patent is extended or adjusted under 35 U.S.C. 154(b) by 878 days.

(21) Appl. No.: 11/056,107

(22) Filed: Feb. 14, 2005

(65) Prior Publication Data

US 2006/0183014 A1 Aug. 17, 2006

(51) Int. Cl.
*H01M 2/00* (2006.01)
*H01M 2/02* (2006.01)
*H01M 8/04* (2006.01)

(52) U.S. Cl. .............................. 429/12; 429/34; 29/623.1
(58) Field of Classification Search .................... 429/12, 429/34; 29/623.1
See application file for complete search history.

(56) References Cited

U.S. PATENT DOCUMENTS

| | | | | |
|---|---|---|---|---|
| 5,176,966 | A | 1/1993 | Epp et al. | 429/26 |
| 5,284,714 | A | 2/1994 | Anderson et al. | 428/474.4 |
| 6,080,503 | A * | 6/2000 | Schmid et al. | 429/35 |
| 6,387,557 | B1 | 5/2002 | Krasij et al. | 429/32 |
| 6,495,278 | B1 | 12/2002 | Schmid et al. | 429/30 |
| 6,761,991 | B2 * | 7/2004 | Frisch et al. | 429/35 |
| 6,852,439 | B2 * | 2/2005 | Frank et al. | 429/35 |
| 2001/0019790 | A1 | 9/2001 | Regan et al. | 429/35 |
| 2001/0044042 | A1 | 11/2001 | Inoue et al. | 429/35 |
| 2001/0055708 | A1 | 12/2001 | Kasij et al. | 429/32 |
| 2002/0031698 | A1 | 3/2002 | Inoue et al. | 429/35 |

* cited by examiner

*Primary Examiner*—Patrick Ryan
*Assistant Examiner*—Julian Mercado
(74) *Attorney, Agent, or Firm*—Steven C. Bauman

(57) ABSTRACT

A method for forming a disassembleable fuel cell assembly includes the steps of (a) forming at least two fuel cell assemblies, each of the fuel cells assemblies formed by a method including the steps of (i) providing a membrane electrode assemble and two bipolar plates; (ii) applying a first portion of a curable silicone composition to internal mating surfaces of at least one of the bipolar plates; (iii) aligning the membrane electrode assembly between the two bipolar plates; (iv) compressing the bipolar so that the first portion of the silicone composition abuts the adjacent internal mating surface of the adjacent bipolar plate; (v) curing the first portion of the silicone composition to adhesively bond the adjacent internal mating surfaces; and (vi) further compressing the bipolar plates to compress the cured first portion of the silicone composition to mechanically seal the adjacent mating surfaces against surface imperfections and/or leak paths; (vii) applying a second portion of the curable silicone composition to the outermost mating surfaces of at least one of the bipolar plates; (viii) aligning an additional bipolar plate with the outermost mating surfaces; (ix) curing the second portion of the curable silicone composition without adhering to the mating surface of the additional bipolar plate; and (b) aligning the at least two fuel cell assemblies so that the externally disposed cured silicone composition abuts both assemblies; and (c) compressing the fuel cell assemblies to provide a repairable seal disposed between the two fuel cell assemblies.

5 Claims, 7 Drawing Sheets

METHOD AND COMPOSITION FOR BONDING AND SEALING FUEL CELL COMPONENTS

CROSS REFERENCE TO RELATED APPLICATIONS

This application is the U.S. National Phase of International Patent Application No. PCT/US2004/16339, filed May 25, 2004 which claims the benefit of an earlier filing date under 35 U.S.C. § 120 to U.S. Provisional Application No. 60/474,158, filed May 29, 2003.

FIELD OF THE INVENTION

The present invention relates to a method and a composition for bonding and sealing components of a fuel cell and a fuel cell formed therefrom. More particularly, the present invention relates to a method and to a composition for bonding and sealing membrane, electrode assemblies, bipolar plates, and combinations of membrane electrode assemblies and bipolar plates to form rebuildable, repairable fuel cells.

BACKGROUND OF RELATED TECHNOLOGY

Although there are various known types of fuel cells, one common type of fuel cell is a proton exchange membrane (PEM) fuel cell. The PEM fuel cell contains a membrane electrode assembly (MEA) provided between two flow field or bipolar plates. Gaskets are used between the bipolar plates and the MEA to provide seals thereat. Additionally, since an individual PEM fuel cell typically provides relatively low voltage or power, multiple PEM fuel cells are stacked to increase the overall electrical output of the resulting fuel cell assembly. Sealing is also required between the individual PEM fuel cells. Moreover, cooling plates are also typically provided to control temperature within the fuel cell. Such plates are also sealed to prevent leakage within the fuel cell assembly. After assembling the fuel cell stack is clamped to secure the assembly.

Preformed gaskets have been used to seal fuel cell components, see e.g., U.S. Pat. Nos. 5,176,966 and 5,284,714. The assignee of these patents, however, describes in U.S. Pat. No. 6,495,278 that such preformed patents tend to leak over time and that adhesive bonding of a membrane electrode assembly (MEA) to an adjacent pair of separator plates of a PEM fuel cell with epoxy resins, methacrylate resins, polyurethane polymers (PUR) or aliphatic polysulfides (ALIPS) reduces leakage.

Other document patents also describe the use of adhesives for bonding and sealing fuel cell components. For example, U.S. Patent Application Publication No. US 2001/00197790 describes the injection of a thermosetting silicone rubber into cavities of a PEM fuel cell to provide a formed-in-place gasket after sealing. Moreover, International Patent Publication No. WO 02/093672 A2 describes the use of a polysiloxane composition injected into fuel cell cavities to also adhesively bond the fuel cell components.

Furthermore, U.S. Patent Application Publication No. US 2001/0044042 describes the use of a thermosetting fluorine-containing material or a thermosetting silicone as a formed-in-place gasket material placed in grooves between separator plates of a fuel cell and in grooves between separator plates and membrane electrode assemblies of a fuel cell. The material used between the separator plates and the membrane electrode assemblies is described as being adhesive to bond these components. The material used between just the separator plates is described as being non-adhesive to permit replaceability of the components upon disassembly of the fuel cell assembly.

U.S. Patent Application Publication No. US 2002/0031698 describes the use of thermosetting silicone sealant to adhesively bond fuel cell components and the use of a thermosetting fluorine-containing sealant with low shear adhesive strength to non-adhesively bong the separator plates. The later sealant is described as being useful for providing stacked fuel cell assemblies with separability and rebuildability features. The sealants are described as being placed into grooves of opposing fuel cell elements. The opposing fuel cell elements are then placed together where the sealants are heated to cure the sealants and to seal and bond the elements.

The above-discussed preformed and formed-in-place gasket techniques, however, have not provided adequate sealing, have not been feasible or practical for mass production of multiple fuel cells, or have provided sealing at the expense of repairability or replaceability by adhesively bonding the various components of a fuel cell. Particularly, preformed gaskets do not generally compensate for fuel cell component tolerances or dimensional variabilities, and the above-discussed formed-in-place gaskets have not provided adequate sealability or repairability. Thus, there is a need for improved sealing compositions and methods for providing a fuel cell having both sealing and repairability.

SUMMARY OF THE INVENTION

In one aspect of the present invention, a method for forming a disassembleable fuel cell assembly is provided. The method includes, but is not limited to, the steps of
(a) forming at least two fuel cell sub-assemblies, each of the fuel cells assemblies formed by a method comprising:
  (i) providing a membrane electrode assemble and two bipolar plates;
  (ii) applying a first portion of a curable silicone composition to internal mating surfaces of at least one of the bipolar plates;
  (iii) applying a second portion of the curable silicone composition to outermost mating surfaces of at least one of the bipolar plates;
  (iv) aligning the membrane electrode assembly between the two bipolar plates;
  (v) aligning a release plate to abuttingly engage the second portion of the curable silicone composition;
  (vi) compressing the bipolar plates and the release plate so that the first portion of the silicone composition abuts the adjacent internal mating surface of the adjacent bipolar plate and to compress the first and second portions of the silicone composition;
  (vii) curing the first portion of the silicone composition to adhesively bond the adjacent internal mating surfaces;
  (viii) curing the second portion of the silicone composition to adhesively bond the second portion to the outermost mating surfaces; and
  (ix) removing the release plate to provide an externally disposed and cured silicone composition;
(b) aligning the at least two fuel cell assemblies so that the externally disposed and cured silicone composition abuts both assemblies; and
(c) compressing the fuel cell assemblies to provide a repairable seal disposed between the two fuel cell assemblies.

Fuels cells formed by applying a curable composition, compressing the curable composition and then curing the curable composition have been found to offer increased leak-resistance in fuel cells as compared to the use of preformed or formed-in-place gaskets.

In another aspect of the present invention, a method for forming a fuel cell includes the step of
(a) applying a curable composition at a thickness which is compressible when cured to a first fuel cell component comprising at least one fuel cell plate;
(b) mating the first fuel cell component with a second fuel cell component comprising at least one fuel cell plate;
(c) compressing the first fuel cell component and the second fuel cell component with a compressive force to abuttingly engage the second fuel cell component and the curable composition; and
(d) curing the curable composition to form an adhesive bond between the first and second fuel cell components.

Desirably, the step of curing the curable composition between the first and second fuel cell components is done while the first and second fuel cell components are compressed under the compressive force.

Further, the method of this aspect of the present invention may further include the steps of
(e) applying an additional curable composition at a thickness which is compressible when cured to the second fuel cell component,
(f) curing the additional curable composition under the compressive force; and
(g) mating thereto a third fuel cell component comprising at least one fuel cell plate without creating an adhesive bond to the third fuel cell component.

The method of the present invention may further include repeating steps (a)-(d) to form at least two fuel cells and stacking the at least two fuel cells to form a fuel cell assembly which can be disassembled at the third fuel cell component.

In another aspect of the present invention a fuel cell assembly is provided. The fuel cell includes a plurality of fuel cells each comprising at least one mating surface, the fuel cells being mated with adjacent fuel cells at the mating surfaces and each mating surface having a cured composition formed therebetween as a compressible gasket, wherein at least one of the compressible gaskets between the fuel cell is adhesively bonded only to one of the adjacent mating surfaces and the other compressible gaskets are adhesively bonded to both of the adjacent mating surfaces. Desirably, the plurality of fuel cells include proton exchange membrane fuel cells, wherein the mating surfaces are selected from the group consisting of mating surfaces of bipolar plates, mating surfaces of membrane electrode assemblies, or combinations thereof.

Desirably, the cured composition is compressible up to 35% of its thickness. Moreover, the composition is applied at a thickness is at least 0.1 mils.

Fuel cells formed in accordance with the present invention are, when placed under a compressive force, substantially leak-free when tested at an internal pressure of at least 30 psig, provided that the compressive force is greater than the internal pressure. The cured compositions of the present invention conform to its adjacent substrates to eliminate surface imperfections and/or leak-paths.

A useful composition includes a silicone composition. Desirably, the composition has low post-cure volatility and is compatible with proton exchange membranes. Further, the composition is advantageously a low-ionic silicone composition and is non-reactive with metals of group 8 of the periodic table, for example platinum.

In another aspect of the present invention, a curable composition useful in fuel cell assemblies includes (a) polydiorganosiloxanes having curable terminal vinyl groups within the following structure:

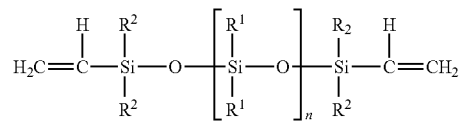

wherein $R^1$ and $R^2$ may be the same or different, and are selected from aryl, alkyl, haloalkyl, hydride, and hydroxide; and n is an integer within the range of about 25 to about 100,000;

(b) polydiorganosiloxanes having hydride functionality within the following structure:

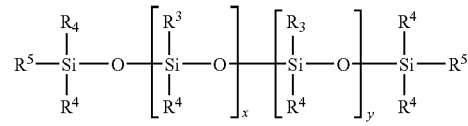

wherein at least one $R^3$ is hydrogen and the other $R^3$ is within $R^4$, $R^4$ is an unsubstituted or substituted monovalent hydrocarbon group; $R^5$ is hydrogen, or an unsubstituted or substituted monovalent hydrocarbon; or $R^3$ is within $R^4$, provided at least one $R^5$ is hydrogen; x is an integer within the range of about 3 and 10 and y is an integer within the range of 0 to about 10,000; and (c) an addition cure catalyst;

wherein the curable composition has low post-cure volatility and is compatible with proton exchange membranes.

Desirably, the addition cure catalyst is a metal-based addition cure catalyst, wherein the metal is a group 8 metal from the periodic table, for example platinum. It is also advantageous that the curable composition is a low ionic composition, including a composition having low amounts of destructive ionics. Further, curable compositions having less than about 1,000 ppm by weight of cyclic siloxanes on a total composition basis are useful.

DETAILED DESCRIPTION OF THE INVENTION

The present invention provides a low volatile, low ionic silicone composition for sealing and/or bonding fuel cell components. The silicone composition contain an addition cure or hydrosilation catalyst that is compatible with the fuel cell assembly in that it does not poison or otherwise adversely effect the catalyst contained within the fuel cell assembly. Furthermore, methods of the present invention include using the inventive compositions as a combination of a cure-in-place sealant and a formed-in-place sealant to provide enhance sealing and bonding while providing disassembly and repairability to the fuel cell assembly.

As used herein, the phrase "cured-in-place" and it variants refer to a composition applied to the surface of one component and cured thereat. Sealing is achieved through compression of the cured material during assembly of the one component with another component. The composition is typically applied by tracing machines in precise patterns. As used herein, the phrase "formed-in-place" and its variants refer to a composition that is placed between two assembled components and is cured to both components.

The combination of the cure-in-place and formed-in-place techniques, for example applying and curing as formed-in-place and sealing as cured-in-place, used in conjunction with the inventive composition of the present invention offers enhanced sealing because both adhesion and compression is used to provide sealing. This combination offers enhanced sealing because, among other things, the mechanical compression obviates the sealing concerns at the knit lines or other dispensing variations of the sealant in fuel cell assemblies. This combination of techniques not only offers enhanced sealing over dimensional variations due to sealant dispensing techniques, but also offers enhanced sealing as it eliminates dimensional variations in the components of the fuel cells. Knit lines are junctions of applied sealant materials. Sealants are typically applied as an elongate bead, elongate strip or elongate thread of material. A knit line is formed where application of the sealant material starts and ends, typically in abutting relationship to one and the other. At the knit line the amount of material or the corresponding height of material is greater as compared to other portions of applied material. In automatic processes, such as robotic tracing or screen printing processes, knit lines and dispensing variations are often located at a similar location or locations on like substrates or components. As the components are subsequently stacked to form an assembly of multiple components, the dimensional variability associated with the knit lines or dispensing variations of individual components are magnified.

Figure 1:
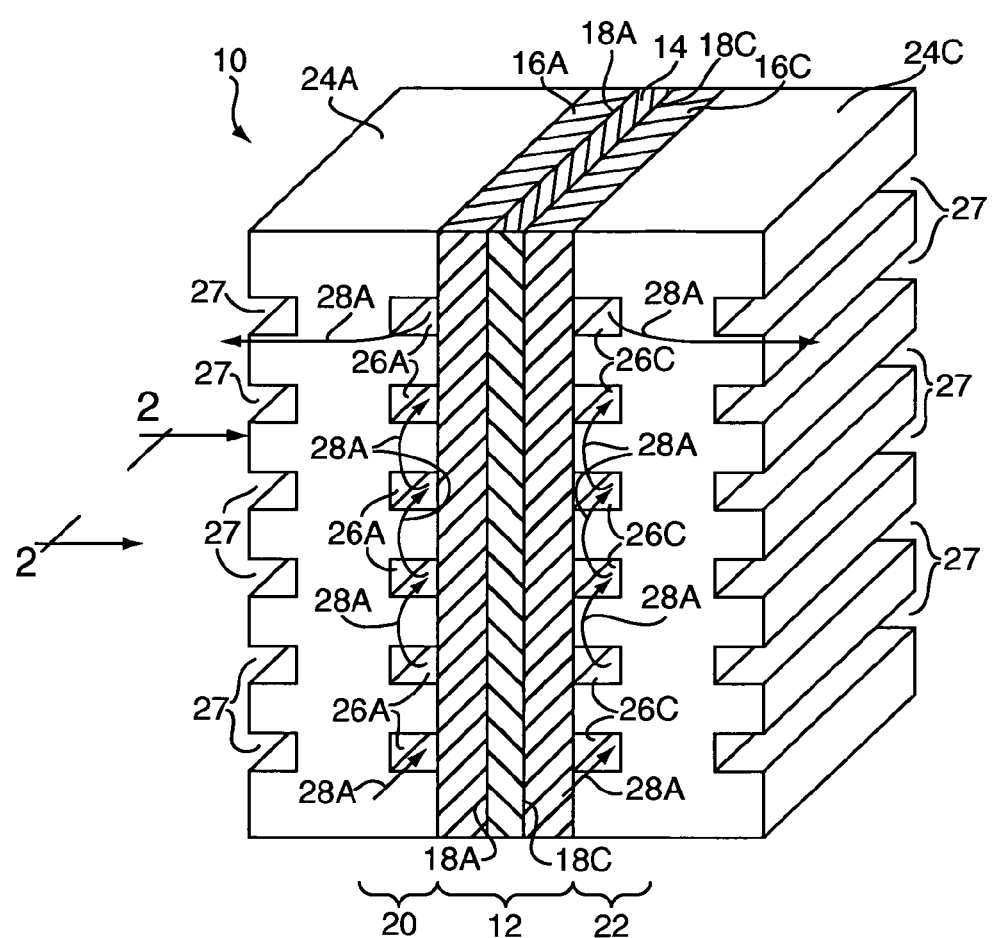
FIG. 1 is a schematic of a fuel cell of the present invention containing a membrane electrode assembly disposed between opposed fluid-flow field plates, which are also commonly referred to as bipolar plates.

FIG. 1 shows, schematically, the basic elements of an electrochemical fuel cell, such as fuel cell 10. Electrochemical fuel cells convert fuel and oxidant to electricity and reaction product. The fuel cell 10 includes a membrane electrode assembly ("MEA") 12 consisting of a solid polymer electrolyte or ion exchange membrane 14 disposed between two electrodes 16A, 16C. The electrodes 16A and 16C are typically formed of porous, electrically conductive sheet material, such as carbon fiber paper. The present invention is not, however, limited to the use of carbon fiber paper and other materials may suitably be used. The MEA 12 contains a layer of catalyst (not shown), typically in the form of finely comminuted platinum, at each membrane/electrode interface 18A, 18C to induce the desired electrochemical reaction. The electrodes 16A, 16C are electrically coupled to provide a path for conducting electrons between the electrodes to an external load (not shown).

At anode 20, the fuel permeates the porous electrode material of electrode 16A and reacts at the catalyst layer (not shown) at membrane/electrode interface 18A to form cations, which migrate through the ion exchange membrane 14 to cathode 22. At the cathode 22, oxygen-containing gas reacts at the catalyst layer (not shown) at membrane/electrode interface 18C to form anions. The anions formed at the cathode 22 react with the cations to form a reaction product.

In electrochemical fuel cells employing hydrogen as the fuel and oxygen-containing air (or substantially pure oxygen) as the oxidant, the catalyzed reaction at the anode 20 produces hydrogen cations (protons) from the fuel supply. The ion exchange membrane 14 facilitates the migration of hydrogen ions from the anode 20 to the cathode 22. In addition to conducting hydrogen ions, the ion exchange membrane 14 isolates the hydrogen-containing fuel stream from the oxygen-containing oxidant stream. At the cathode 22, oxygen reacts at the catalyst layer (not shown) at membrane/electrode interface 18C to form anions. The anions formed at the cathode 22 react with the hydrogen ions that have crossed the ion exchange membrane 14 to form liquid water as the reaction product. The anode and cathode reactions in hydrogen/oxygen fuel cells are shown in the following equations:

$$\text{Anode reaction: } H_2 \rightarrow 2H^+ + 2e^- \qquad (I)$$

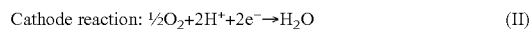

$$\text{Cathode reaction: } \tfrac{1}{2}O_2 + 2H^+ + 2e^- \rightarrow H_2O \qquad (II)$$

The MEA 12 is disposed between two electrically conductive plates, such as fluid-flow field plates or bipolar plates 24A, 24C, each of which has at least one flow passage 26A, 26C contained therein. These fluid-flow field plates or bipolar plates 24A, 24C are typically formed of compressed, exfoliated graphite; porous graphite; stainless steel or graphite composites. The plates may be treated to effect surface properties, such as surface wetting, or may be untreated. The present invention is not, however, limited to the use of such materials for use as the bipolar plates and other materials may suitably be used. The flow passage 26A directs the fuel, as indicated by arrows 28A, to the anode 20 on the fuel side. The flow passage 26C directs the oxidant, as indicated by arrows 28C, to the cathode 22 on the oxidant side.

The bipolar plates 24A, 24C may have additional flow passages 27 opposed to flow passages 26A and 26C. The additional flow passages 27 serve as fuel or oxidant flow paths for an adjoining fuel cell (not shown). The plates 24A and 24C are referred to as bipolar because they have opposed flow passages, for instance flow passages 26A and 27.

In a single cell arrangement, fluid-flow field plates are provided on each of the anode and cathode sides. The plates act as current collectors, provide support for the electrodes, provide access channels for the fuel and oxidant to the respective anode and cathode surfaces, and provide channels in some fuel cell designs for the removal of water formed during operation of the cell.

Figure 2:
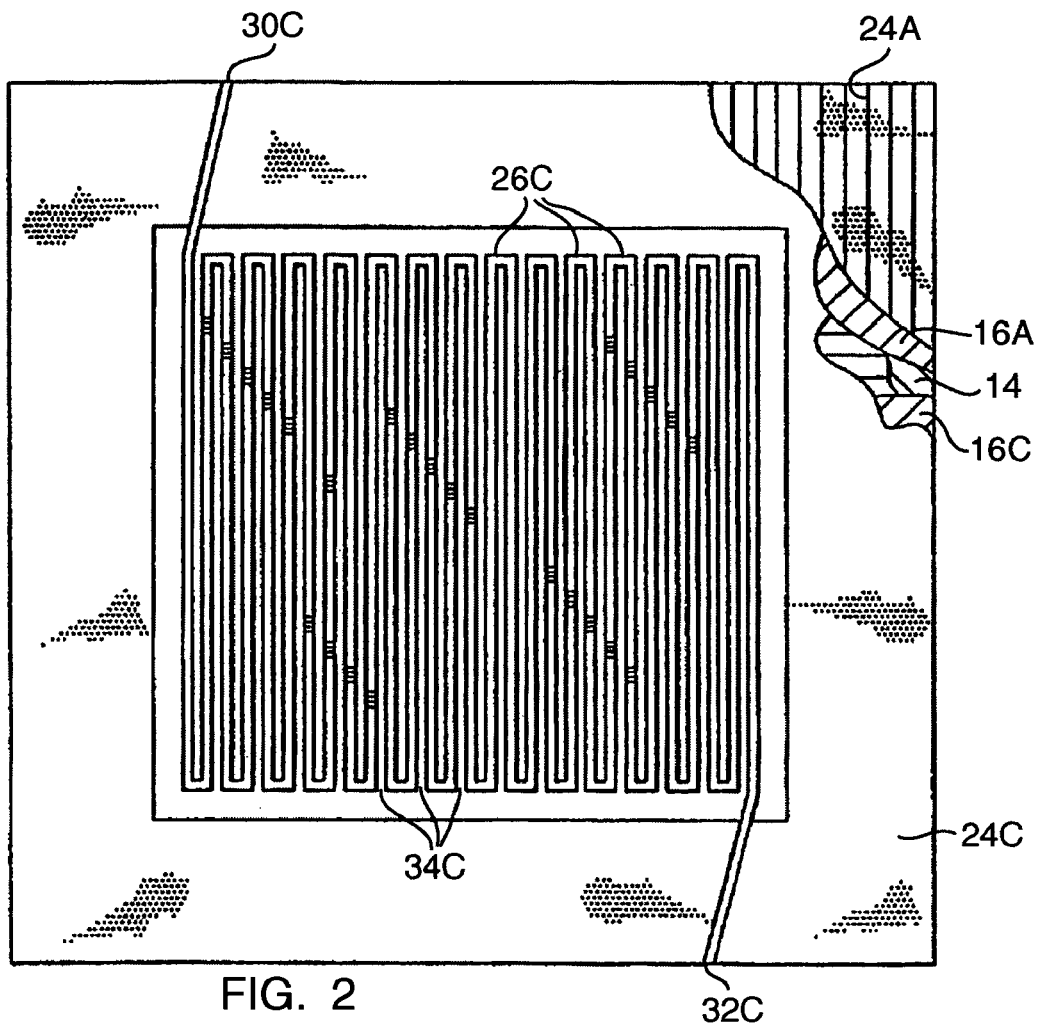
FIG. 2 is a cross-sectional view with a partial cutaway of the fuel cell of FIG. 1 showing a continuous fluid channel for the fluid-flow field plate.

FIG. 2 is a cross-sectional view of a partial cutaway of the fuel cell 10 taken along the 2-2 axis showing fluid-flow field plate 24C. The fluid-flow field plate 24C includes a single continuous fluid-flow channel 26C which has a fluid inlet 30C and a fluid outlet 32C. Fluid inlet 30C is connected to a source of oxidant (not shown). Continuous flow channel 26C traverses in a plurality of passes a major central area of fluid-flow field plate 24C, which corresponds to the electrocatalytically active region of the cathode 22. Fluid field flow plate 24A has a similarly connected fluid-flow channel 26A, but its fluid inlet is connected to a fuel source.

Figure 3:
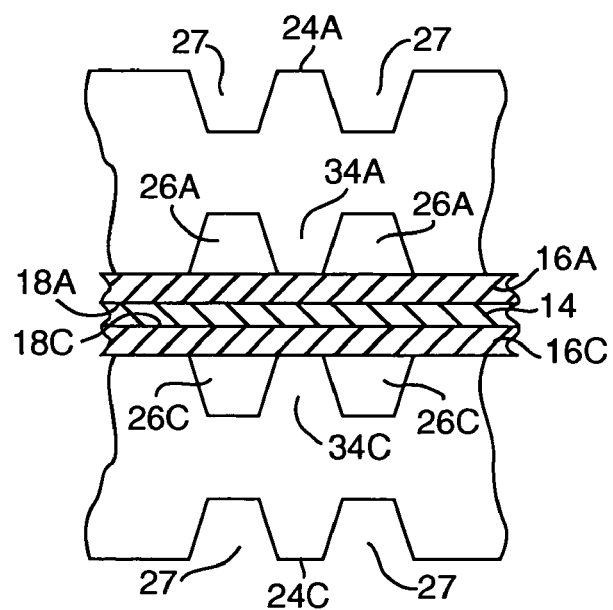
FIG. 3 is a partial cross-sectional view of the continuous fluid channels of the fuel cell of FIG. 2.

As depicted in FIG. 3, the fluid-flow channels 26A, 26C are separated by walls 34A, 34C, respectively. The fluid-flow channels 26A, 26C are typically 1.5 mm deep and 1 to 1.5 mm wide and extend to cover the electrode area of the fuel cell 10. The walls 34A, 34C are typically 1 to 1.5 mm inch thick. The fluid-flow channels 26A, 26C may be formed by a mechanical deformation process, such as stamping, pressing, milling, molding and the like. A compression plate bearing a relief pattern of the fluid-flow channel is useful to impress the pattern in a flexible graphite sheet.

Figure 4:
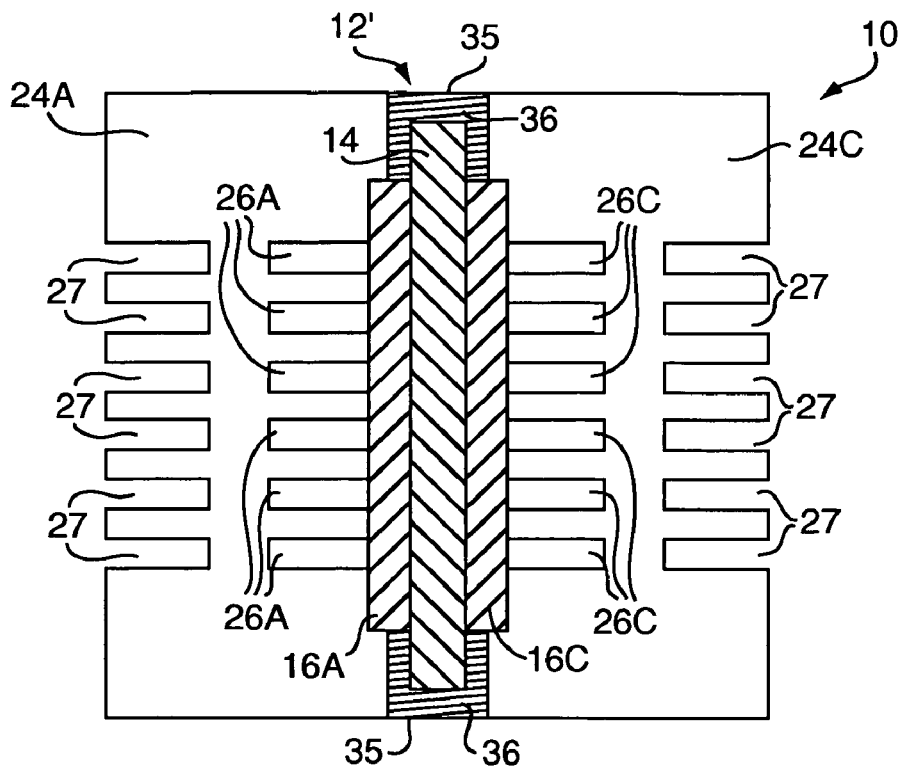
FIG. 4 is a cross-sectional view of a fuel cell having a membrane electrode assembly adhesively secured between opposed fluid-flow field plates.

As depicted in FIG. 4, a composition 36 may be used to securably seal and/or bond the elements of the MEA 12'. For example, composition 36 can adhesively and securably seal and/or bond the fluid-flow field plates or bipolar plates 24A, 24C to prevent leakage of the reactants (fuel and oxidant) and products (water) from the MEA 12'. Alternatively, as discussed below, composition 36 may not be adhesively secured to abutting fuel cell components, such as field flow plates 24A and 24C. Further, as depicted in FIG. 4, composition 36 encapsulates the ends or edges 35 of MEA 12'. The present invention, however, is not so limited and other sealing techniques may be used to seal fuel cell edges.

Figure 5:
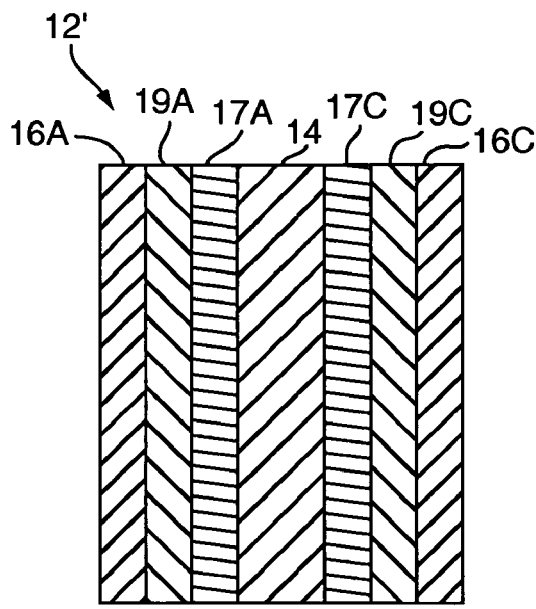
FIG. 5 is a cross-sectional view of a seven-layered membrane electrode assembly of the present invention.
Figure 6:
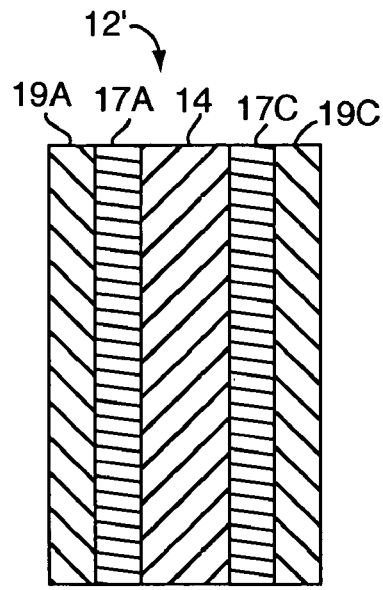
FIG. 6 is a cross-sectional view of a five-layered membrane electrode assembly of the present invention.
Figure 7:
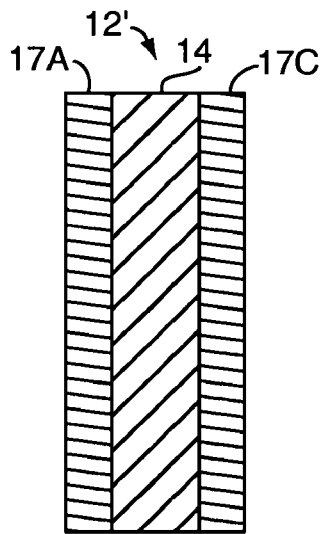
FIG. 7 is a cross-sectional view of a three-layered membrane electrode assembly of the present invention.

Moreover, a composition, such as an adhesive composition, may be used to secure the various elements of MEA's. For example, a seven-layered MEA 12' is cross-sectionally depicted in FIG. 5. Catalyst layers 17A and 17C are disposed on opposed sides of the ion exchange membrane 14. Compositions 19A and 19C sealably join electrodes 16A and 16C, respectively. MEA 12' is not, however, limited to a seven-layered structure. A five-layered MEA 12' is depicted in FIG. 6. The five-layered MEA 12' of FIG. 6 has the ion exchange membrane 14 with catalyst layers 17A and 17C and compositions 19A and 19C disposed thereover or disposed over portions of the catalyst layers 17A and 17C. Further, a three-layered MEA 12' is depicted in FIG. 7 as having the ion exchange membrane 14 and opposed catalyst layers 17A and 17C. The three-layered MEA 12' of FIG. 7 does not have a sealing gasket or sealing material, such as compositions 19A and 19C as shown in FIGS. 5 and 6.

Figure 8:
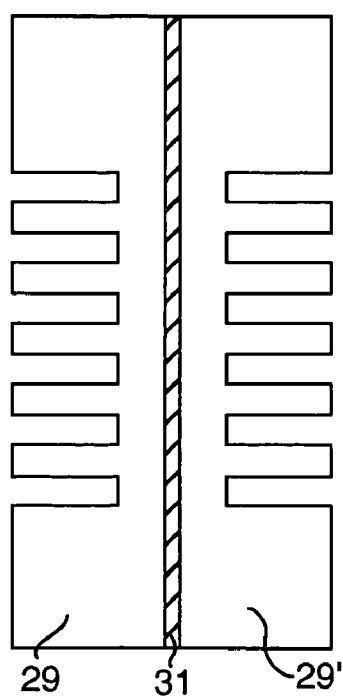
FIG. 8 is a cross-sectional view of two mono-polar plates joined to form a bipolar plate of a fuel cell.

Further, the present invention is not limited to the use of bipolar plates, which have opposed field flow passages. For example as depicted in FIG. 8, mono-polar plates 29 and 29', which have only one set of field flow passages, may suitably be used. Such mono-polar plates 29 and 29' may be adhesively or otherwise mechanically joined. For example, composition 31 may adhesively join mono-polar plates 29 and 29'. Composition 31 may releasably join the mono-polar plates 29 and 29'. Additionally, composition 31 may be a conductive composition that permits electrical conductivity therethrough.

Two or more fuel cells 10 can be connected together, generally in series but sometimes in parallel, to increase the overall power output of the assembly. In series arrangements, one side of a given plate serves as an anode plate for one cell and the other side of the plate can serve as the cathode plate for the adjacent cell. Such a series connected multiple fuel cell arrangement is referred to as a fuel cell stack (not shown), and is usually held together in its assembled state by tie rods and end plates. The stack typically includes manifolds and inlet ports for directing the fuel and the oxidant to the anode and cathode flow field channels.

Figure 9:
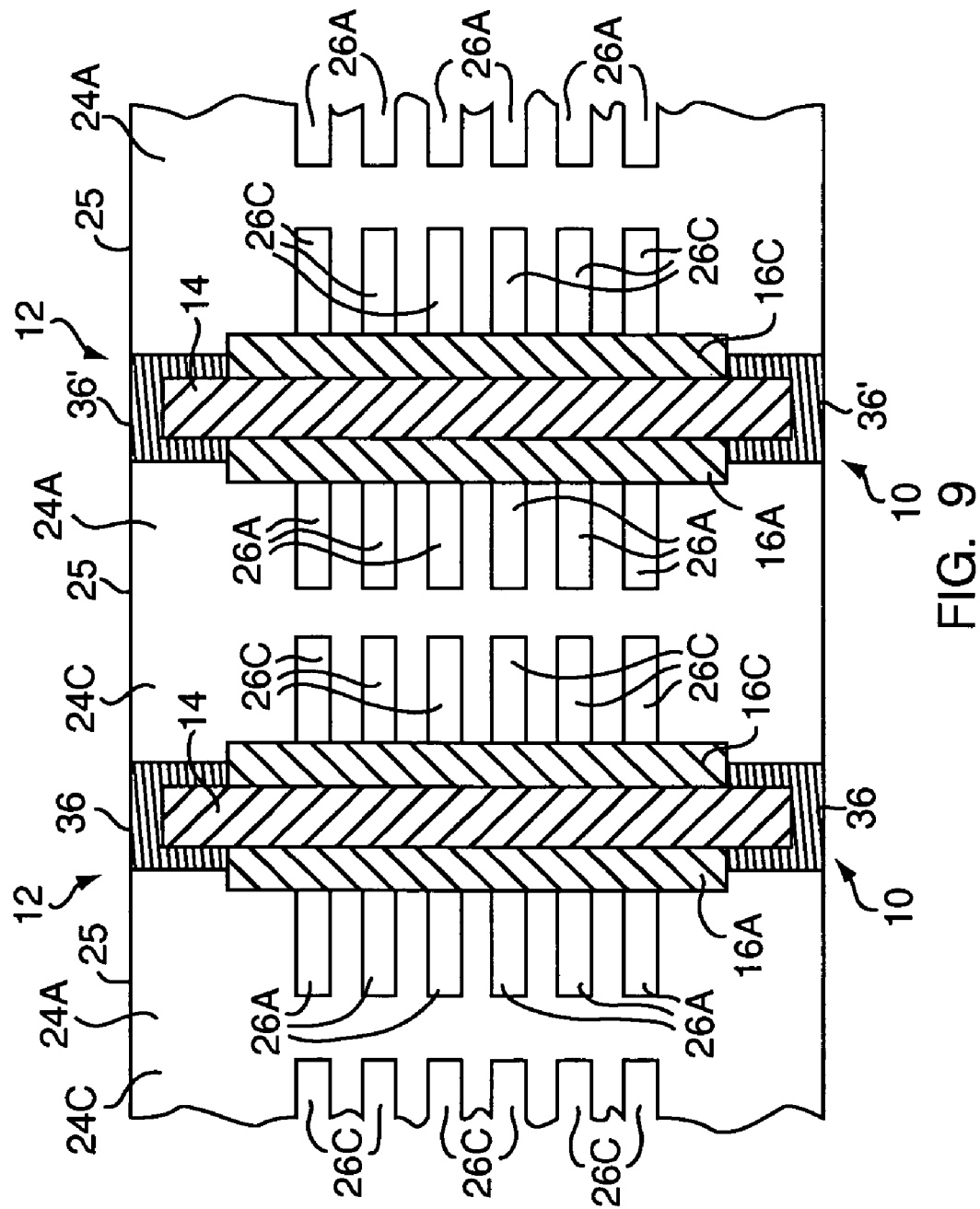
FIG. 9 is a cross-sectional view of a plurality of fuel cell components.

As depicted in FIG. 9, a plurality of fuel cells 10 or a plurality of MEA's 12 may be joined together. For example, composition 36, 36' can securably seal and/or bond the fluid-flow field plates or bipolar plates 24A, 24C, which are shown as plate 25 having both flow passages 26A and 26C. The composition 36 and 36' may be the same or different.

Figure 10:
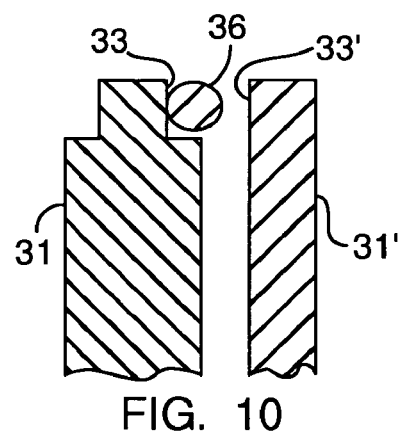
FIG. 10 is a partial cross-sectional view of fuel cell components, one of which having a sealant composition thereon.
Figure 11:
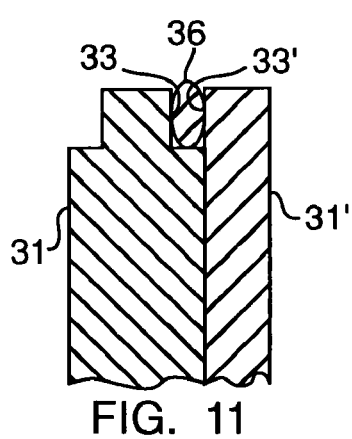
FIG. 11 is a partial cross-sectional view of the fuel cell components of FIG. 10 being in a compressed configuration.

As depicted in FIG. 10, the compositions of the present invention, for example composition 36, may be applied to a fuel cell component 31. Fuel cell component 31 may be any of the above-described structures, for example a bipolar plate, a mono-polar plate, a MEA, different elements of a MEA, a coolant plate or a separator plate. As discussed in further detail below, components 31 and 31' may be pressed against one and the other to have composition 36 abuttingly disposed between mating surfaces 33 and 33' of fuel cell components 31 and 31', respectively. Composition 36 may then be cured to adhesively join fuel cell components 31 and 31', as depicted in FIG. 11.

Figure 12:
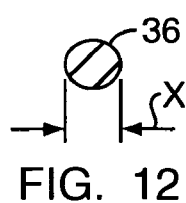
FIG. 12 is a cross-sectional view of the sealant composition of FIG. 10 having a thickness.
Figure 13:
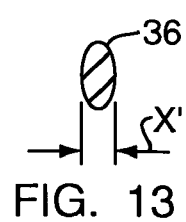
FIG. 13 is a cross-sectional view of the sealant composition of FIG. 11 having a compressed thickness.

The composition 36 of FIG. 10 has a thickness or height X as depicted in FIG. 12 and has a compressed thickness or height X' as depicted in FIG. 13, where X' is less than X. Desirably, composition 36 is resiliently compressible up to about 50% of its thickness, i.e., X' is up to about 50% of X. Compositions with other resilient compressibilities may suitably be used. For example, compositions with resilient compressibilities from about 1% to about 50% are useful. Also useful are compositions having a resilient compressibility from about 5% to about 35%. Desirably, the composition has a resilient compressibility from about 10% to about 25%. As used herein, compressibility of a composition refers to the ability of the composition, that is substantially dimensionally stable on a substrate, to dimensionally reduce under force while maintaining its overall structure, sealing and adhesive characteristics. In other words, the composition may be squeezed to some degree while still maintaining its ability to sealingly join substrates. The composition 36 of FIGS. 10 and 12 is shown as a round bead, but the present invention is not so limited, and other applied shapes may be suitably be used. Further, the composition 36 of FIGS. 11 and 13 is shown compressed as an elliptical shape, but other compressed shaped may suitably be used.

The amount of thickness X of composition 36 applied to a fuel cell component varies, and the composition 36 may be applied at a thickness of up to about 500 mils (about 13 mm) or greater. Desirably, the composition is applied at a thickness of about 0.1 mils to about 500 mils (or, about 0.0025 mm to about 33 mm). More desirably, the composition is applied from about 1 mil to about 40 mils (or, about 0.025 mm to about 1.0 mm), including thicknesses from about 1 mil to about 5 mils (or, about 0.025 mm to about 0.13 mm).

Figure 14:
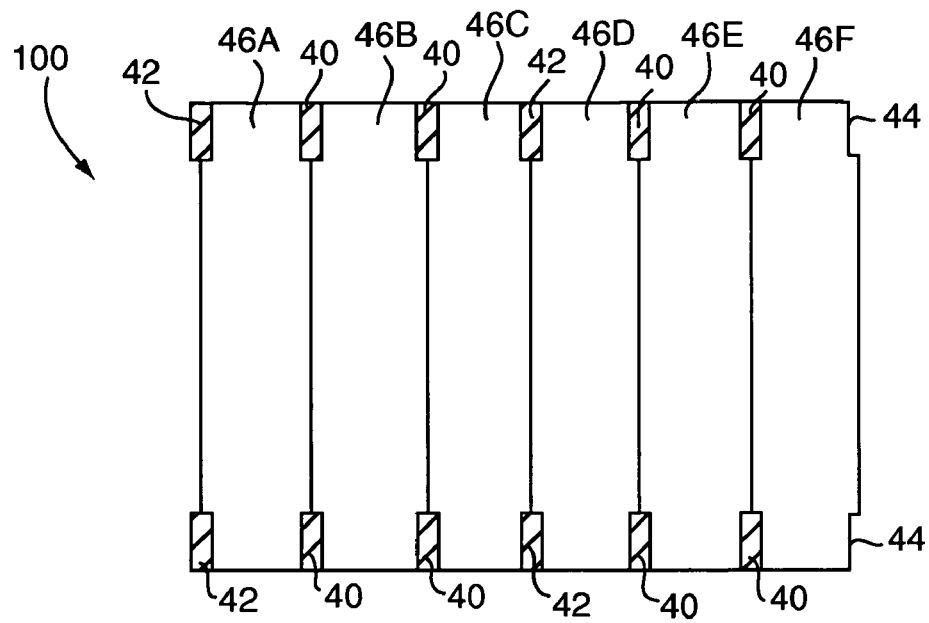
FIG. 14 is a depiction of an assembled fuel cell assembly having a disassembly and repairability feature according to the present invention.
Figure 15:
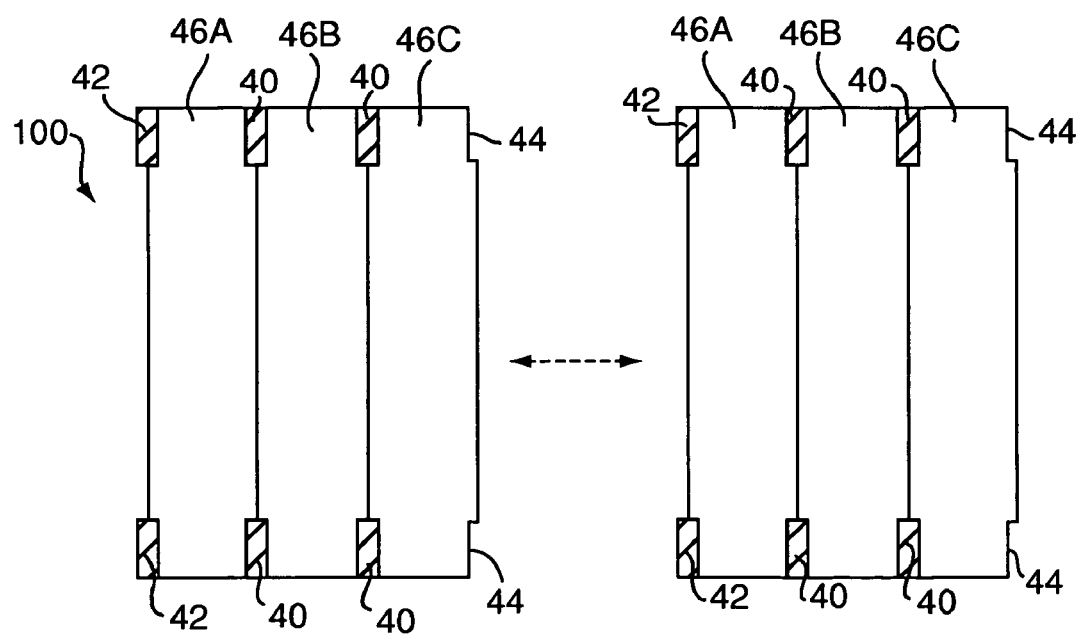
FIG. 15 is a depiction of a disassembled fuel cell assembly having a disassembly and repairability feature according to the present invention.

As depicted in FIG. 14, the compositions of the present invention are applied to fuel cell components to adhesively secure and seal the components and applied to certain fuel cell components to just seal. For example, fuel cell assembly 100 includes a plurality of fuel cell modules 46A through 46F, which represent the plurality of fuel cells elements as described above, having compositions for sealing and/or bonding the modules. Fuel cell modules 46A through 46C are adhesively secured to one and the other via composition 40, and fuel cell modules 46D through 46F are adhesively secured to one and the other via composition 40. Fuel cell modules 46C and 46D are sealed via composition 42, but not adhesively secured. In other words, composition 42 is adhesively bonded to only one of the fuel cell modules, for example fuel cell module 46D, to provide a sealing function as a gasket upon mechanical securement of the fuel cell modules to form the fuel cell assembly 100. Because the composition is not adhesively bonded to both fuel cell modules, the fuel cell modules 46C and 46D are separable from one and the other, as depicted in FIG. 15. Moreover, the fuel cell modules may have a mating surface 44 or groove for facilitating placement and compression of the silicone compositions of the present invention.

Figure 16:
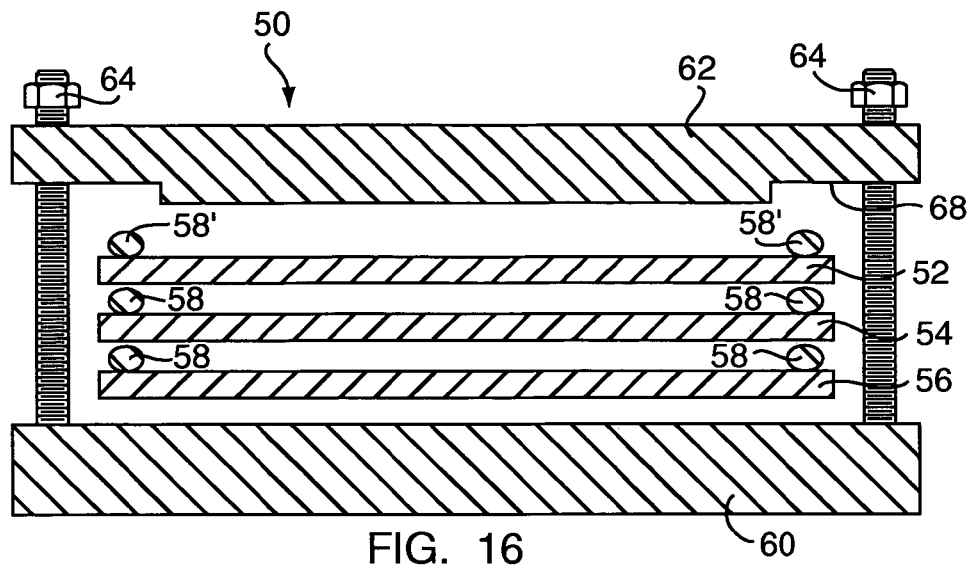
FIG. 16 is a schematic depiction of an assembly for forming fuel cells in accordance with the present invention.

FIG. 16 depicts an apparatus 50 useful for producing the fuel cell assemblies of the present invention. Fuel cell components 52, 54 and 56 have compositions 58 disposed thereon. The composition 58 may be robotically dispensed, screen printed or dispensed by other methods onto the fuel cell components 52, 54 and 56. The fuel cell components are then placed onto the base 60 of apparatus 50. The fuel cell components 52, 54 and 56 are aligned and compressed to a desired height or thickness. Compression is accomplished by controllably forcing down top plate 62 toward the bottom plate 60. The top plate 62 is then secured to control the desired height or thickness of the fuel cell components. Any suitable means may be used to clamp the top plate 62, for example a nut/bolt assembly 64 may be used. The compositions 58 are then cured while under compression within apparatus 50. Desirably, top plate 62 is made from a releasable material or has a layer of releasable material associated with its surface 68. Alternatively, a layer of releasable material (not shown) may be placed between the top plate 62 and the fuel cell component 52, provides that it covers the composition deposited thereat. Any suitable release material, such as Teflon®, may suitably be used.

After curing, cured compositions 58 are adhesively secured to adjacent fuel cell components, such as fuel cell components 52 and 54 and fuel cell components 54 and 56. The composition 58' cured between the release layer and the fuel cell component 52 is adhesively secured only to fuel cell component 52. This cured composition 58', after being released from the release layer, allows the fuel cell assemblies of the present invention to have repairability and rebuildability. Thus, this cured composition 58' acts as a cured-in-place gasket while the other cured compositions 58 act as formed-in-place gaskets having the compressingly sealable features of cured-in-place gaskets. The fuel cell component 52 with the cured composition 58' may be mated to any of the above-described fuel cell components or structures, for example a bipolar plate, a mono-polar plate, a MEA, different elements of a MEA, a coolant plate or a separator plate or alternatively, may be mated to fuel cell top or bottom plates, which are described below in conjunction with FIG. 17.

Figure 17:
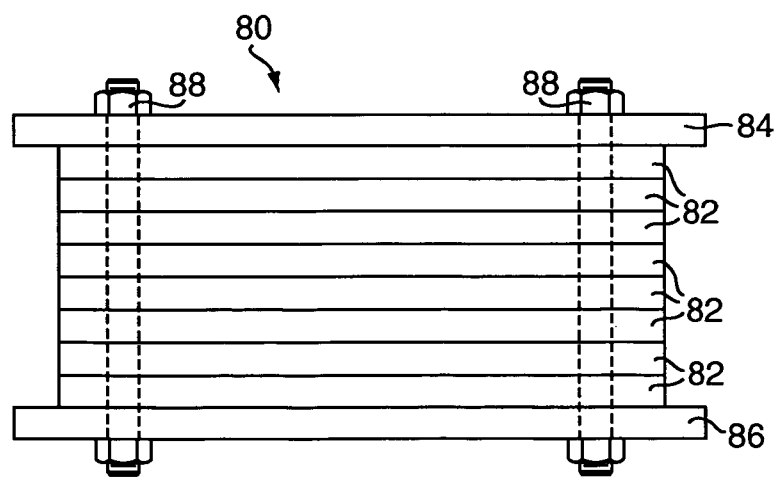
FIG. 17 is a schematic depiction of a fuel cell assembly of the present invention.

As depicted in FIG. 17, fuel cell modules 82 are formed into a fuel cell assembly 80 by aligning and stacking the fuel cell modules 82 between fuel cell top plate 84 and fuel cell bottom plate 86. Compressive force is applied and maintained on the fuel cell modules 82 to mechanically compress the compositions of the present invention (not shown) to seal any leak paths of fuel cell assembly 80. As discussed above, at least one of the fuel cell modules 82 advantageously have a repairable and/or rebuildable sealant composition. One means for compressing the fuel cell assembly 80 is depicted in FIG. 17 as nut and bolt assemblies 88. Other means for compressing and maintaining some compressive force may suitably be used.

Desirably, the fuel cell assemblies or fuel cell modules of the present invention are substantially leak-free up to an internal pressure of about 60 psig, provided that the assemblies or modules are clamped together at a force greater than internal pressure. Desirably, the assemblies or modules are substantially leak-free up to an internal pressure of about 30 psig when clamped with a greater compressive force. Lower leak-free, internal pressures of about 7 to about 15 psig, which are typical operating pressures of PEM fuel cells, may be used with the present invention, but higher leak-free pressures are preferred.

Compositions useful with the present invention include silicone compositions, the cured elastomers of which having improved adhesive and sealing properties for use in fuel cells. The compositions include a reactive silicone component, where the silicone component cures by way of an addition cure mechanism. An addition cure catalyst or hydrosilation catalyst is also provided.

As used herein, "addition curable silicone component" includes addition curing silicone fluids curable under elevated temperature or room temperature conditions. Such polymers are capable of curing in the presence of an addition cure catalyst at elevated temperature conditions, such as about room temperature or greater, but less than about 200° C. Desirably, the polymers are capable of curing in the presence of an addition cure catalyst at temperatures elevated from room temperature, for example from about 50° C. to about 100° C.

The addition curable silicone component of the present invention contains functional groups capable of undergoing addition reactions in the presence of an addition cure catalyst. Typically, the addition curable silicone component includes, for example, polydiorganosiloxanes having terminal vinyl groups that are curable, together with polydiorganosiloxanes having, for example, hydride functionality available for reaction to form an elastomer.

The vinyl-terminated polydimethylsiloxanes may be used in an amount within the range of about 25% to about 90% by weight of the composition, such as about 40% to about 80% by weight.

Examples of the vinyl-terminated polydimethylsiloxanes may be found within the following structure I:

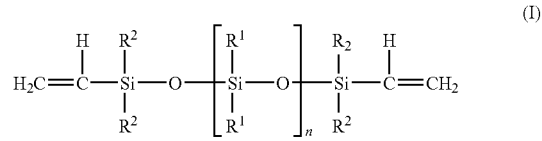

(I)

where $R^1$ and $R^2$ may be the same or different, and are selected from aryl, alkyl, haloalkyl (such as triflouropropyl), hydride, hydroxide and the like; and n is an integer between about 25 and 100,000.

The hydride-functionalized polydimethylsiloxanes should be present in an amount within the range of about 1% to about 15% by weight of the total composition, such as about 3% to about 10% by weight.

Examples of the hydride-functionalized polydimethylsiloxanes may be found within the following structure II:

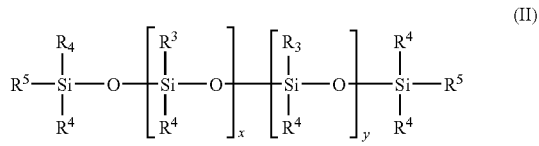

where at least one $R^3$ is hydrogen and the other $R^3$ is within $R^4$, $R^4$ is an unsubstituted or substituted monovalent hydrocarbon group exemplified by alkyl groups, such as methyl, ethyl, propyl and butyl groups; cycloalkyl groups, such as cyclopentyl and cyclohexyl groups; alkenyl groups, such as vinyl and allyl groups; and aryl groups, such as phenyl and tolyl groups; as well as those substituted groups obtained by replacing at least a portion of the hydrogen atoms in the hydrocarbon groups with electron withdrawing groups, such as halogen atoms, cyano groups and the like; $R^5$ is hydrogen, or an unsubstituted or substituted monovalent hydrocarbon group exemplified by alkyl groups, such as methyl, ethyl, propyl and butyl groups; cycloalkyl groups, such as cyclopentyl and cyclohexyl groups; alkenyl groups, such as vinyl and allyl groups; and aryl groups, such as phenyl and tolyl groups; as well as those substituted groups obtained by replacing at least a portion of the hydrogen atoms in the hydrocarbon groups with electron withdrawing groups, such as halogen atoms, cyano groups and the like; or $R^3$ is within $R^4$, provided at least one $R^5$ is hydrogen; and x is an integer within the range of about 3 and 10 and y is an integer within the range of 0 to about 10,000.

In the present invention, the vinyl-terminated polydimethylsiloxanes can have viscosities that range from about 100 cst (or centistokes) to about 400,000 cst, desirably from about 4,000 cst to about 50,000 cst. The hydride-functionalized polydimethylsiloxanes can have viscosities that range from about 5 cst to about 1,000 cst, desirably from about 20 cst to about 100 cst.

Desirably, the silicone compositions of the present invention have a low, post-cure volatility. As used herein, the phrase "low post-cure volatility" and its variants refer to compositions having a low migration of volatile species from the cured composition to adjoining or proximal substrates. One group of materials that potentially migrate from cured compositions are cyclic siloxanes. Such compounds can potentially migrate into fuel cell components or substrates and can effect the electrical properties of the components or substrates, as cyclic siloxanes are non-conductive. Desirably, compositions of the present invention have low, post-cure volatilities as indicated by having less than about 1,000 wppm (parts-per-million by weight) of cyclic siloxanes. More desirably, compositions of the present invention have less than about 300 wppm of cyclic siloxanes. Even more desirably, compositions of the present invention have less than about 50 wppm of cyclic siloxanes.

Further, the silicone compositions of the present invention are low ionic compositions. As used herein the term "ionics" and its variants refer to materials that are water-extractable or leachable from cured compositions. Such ionics can lead to buildup of corrosion products with the fuel cell. Further, certain ionics are destructive to fuel cells as they poison the fuel cell catalyst. Such destructive ionics include, but are not limited to, water-extractable compounds of or containing sulfur; including sulfides, sulfites and sulfates; phosphorus, including phosphates; nitrogen, including nitrides, amides, amines and hydrazides; tin, lead and arsenic. Desirably, the compounds of the present invention have less than about 20 wppm of destructive ionics or destructive ionic compounds. More desirably, the compounds of the present invention have less than about 5 wppm of destructive ionics or destructive ionic compounds. Additionally, the total ionics or amount of total ionic materials in the composition of the present invention should be less than 20 wppm and desirably less than about 5 wppm. Non-limiting examples of ionic materials include water-extractable compounds of or containing aluminum, barium, bromine, calcium, chromium, chloride, copper, fluorine, iron, lead, lithium, magnesium, manganese, nitrogen, phosphorous, potassium, sodium, strontium, tin and zinc.

The silicone compositions of the present invention may also include certain fillers for example, lithopone, zirconium silicate, hydroxides, such as hydroxides of calcium, aluminum, magnesium, iron and the like, diatomaceous earth, carbonates, such as sodium, potassium, calcium, and magnesium carbonates, oxides, such as zinc, magnesium, chromic, cerium, zirconium and aluminum oxides, calcium clay, fumed silicas, treated silicas, precipitated silicas, untreated silicas, graphite, synthetic fibers and mixtures thereof, provided that the fillers do not contain significant amounts of water-extractable ionic materials.

The filler may be used in an amount within the range of about 1% to 70% by weight of the total composition, such as about 10% to about 50% by weight.

The inventive silicone compositions also include an addition cure or hydrosilation catalyst. Suitable addition cure catalysts that can be used with the present compositions include group 8 metal-based catalysts, such as but not limited to, platinum-based or rhodium-based catalysts. Desirably, a platinum-based catalyst is used, such as platinum-siloxane complex commercially available from Bayer Corporation under the trade designation BAYSILONE U catalyst Pt/L (CAS 73018-55-0). Catalysts which may interfere with the fuel cell catalyst should be avoided. For example, tin-based catalysts should be avoided.

The addition cure catalyst should be used in an amount within the range of about 0.001% to about 1% by weight of the total composition.

Other additives can also be incorporated into the inventive compositions, provided they do not adversely affect the ability of the compositions to seal or bond fuel cell components or to otherwise adversely affect the performance of the fuel cell. For example, an adhesion promoter can be added to the inventive compositions. Such an adhesion promoter can include, for example, octyl trimethoxysilane (commercially available from Witco Corporation, Greenwich, Conn. under the trade designation A-137), glycidyl propyl trimethoxysilane (commercially available from Witco under the trade designation A-187), methacryloxypropyl trimethoxysilane (commercially available from Witco under the trade designation A-174), vinyl trimethoxysilane, methyltrimethoxysilane, vinyltrimethoxysilane, methyltriethoxysilane, vinyltriethoxysilane, enoxysilanes, tetraethoxysilane and combinations thereof. Desirably, the adhesion promoter is glycidyl propyl trimethoxysilane, vinyl trimethoxysilane and combinations thereof.

The adhesion promoters, when present, may be used in an amount within the range of about 0.05 to about 2% by weight of the total composition.

The silicone compositions of the present invention may also include additional crosslinkers. The additional crosslinkers are those capable of reacting with vinyl-terminated and/or hydride-functionalized polydimethylsiloxanes. For instance, trimethylsilyl-terminated hydrogenmethyl dimethyl siloxane copolymer with two or more hydrides per molecule (commercially available from PPG Industries as MASIL XL-1) is appropriate for use herein. Other conventionally known crosslinkers can also be used with the present compositions provided they are able to crosslink the present compositions through an addition cure mechanism without adversely affecting the adhesive and sealant properties of the fuel cell assembly.

In addition, to modify the dispensing properties through viscosity adjustment, a thixotropic agent may also be included. The thixotropic agent may be used in an amount within the range of about 0.05 to about 25% by weight of the total composition. Examples of such a thixotropic agent include reinforcing silicas, such as fused or fumed silicas, and may be untreated or treated so as to alter the chemical nature of their surface. Virtually any reinforcing fused, precipitated or fumed silica may be used.

Examples of such treated fumed silicas include polydimethylsiloxane-treated silicas and hexamethyldisilazane-treated silicas. Such treated silicas are commercially available, such as from Cabot Corporation under the tradename CAB-O-SIL ND-TS and Degussa Corporation under the tradename AEROSIL, such as AEROSIL R805.

Of the untreated silicas, amorphous and hydrous silicas may be used. For instance, commercially available amorphous silicas include AEROSIL 300 with an average particle size of the primary particles of about 7 nm, AEROSIL 200 with an average particle size of the primary particles of about 12 nm, AEROSIL 130 with an average size of the primary particles of about 16 nm; and commercially available hydrous silicas include NIPSIL E150 with an average particle size of 4.5 nm, NIPSIL E200A with and average particle size of 2.0 nm, and NIPSIL E220A with an average particle size of 1.0 nm (manufactured by Japan Silica Kogya Inc.).

Hydroxyl-functional alcohols are also well-suited as the thixotropic agent, such as tris[copoly(oxypropylene)(oxypropylene)]ether of trimethylol propane, and $[H(OC_2H_6)_x(OC_2H_4)_y-O-CH_2]_3-C-CH_2-CH_3$, where x and y are each integers that may be the same or different and are within the range of about 1 to about 8,000, and is available commercially from BASF Wyandotte Corp., Wyandotte, Mich. under the tradename PLURACOL V-10.

The invention being thus described, it will be clear to those persons of skill in the art that many variations exist, which are not to be regarded as a departure from the spirit and scope of the invention. All such variations are intended to be within the scope of the claims.

What is claimed is:

1. A method for forming a fuel cell comprising:
   (a) applying a first curable composition at a thickness which is compressible when cured to a first fuel cell component comprising at least one fuel cell plate;
   (b) mating the first fuel cell component with a second fuel cell component comprising at least one fuel cell plate;
   (c) compressing the first fuel cell component and the second fuel cell component with a compressive force to abuttingly engage the second fuel cell component and the first curable composition with the first curable composition disposed between the first fuel cell component and the second fuel cell component;
   (d) curing the first curable composition to form an adhesive bond between the first and second fuel cell components;
   (e) applying a second curable composition at a thickness which is compressible when cured to the second fuel cell component;
   (f) curing the second curable composition under a compressive force; and
   (g) mating a third fuel cell component comprising at least one fuel cell plate to the cured second curable composition without creating an adhesive bond to the third fuel cell component.

2. The method of claim 1, wherein the step of curing the curable composition between the first and second fuel cell components is done while the first and second fuel cell components are compressed under the compressive force.

3. The method of claim 1, wherein the fuel cell, when placed under a compressive force is substantially leak-free when tested at an internal pressure of at least 30 psig, provided that the compressive force is greater than the internal pressure.

4. The method of claim 1, wherein the composition is a silicone composition.

5. The method of claim 1, further comprising:
   repeating steps (a)-(d) to form at least two fuel cells and stacking the at least two fuel cell to form a fuel cell assembly which can be disassembled at the cured second curable component mated against the third fuel cell component.

* * * * *